Sept. 8, 1959  D. W. BRADY  2,902,813
VEGETATION CUTTING MEANS
Filed May 17, 1957
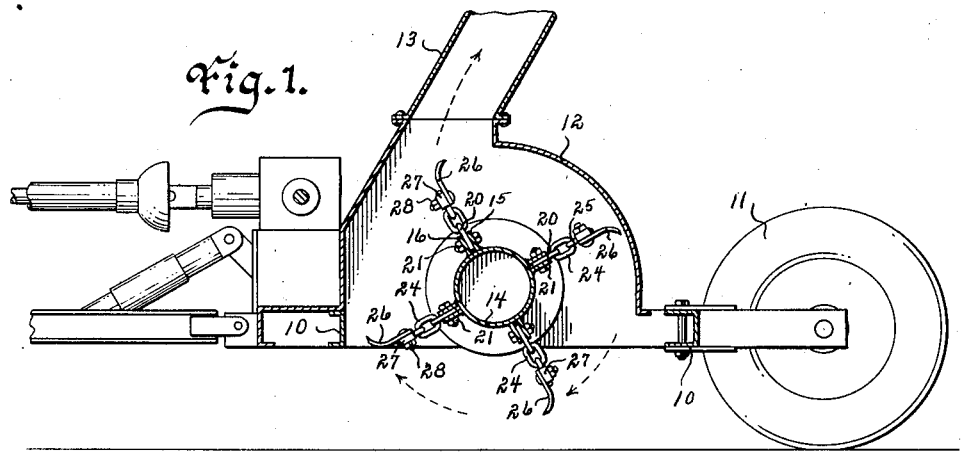
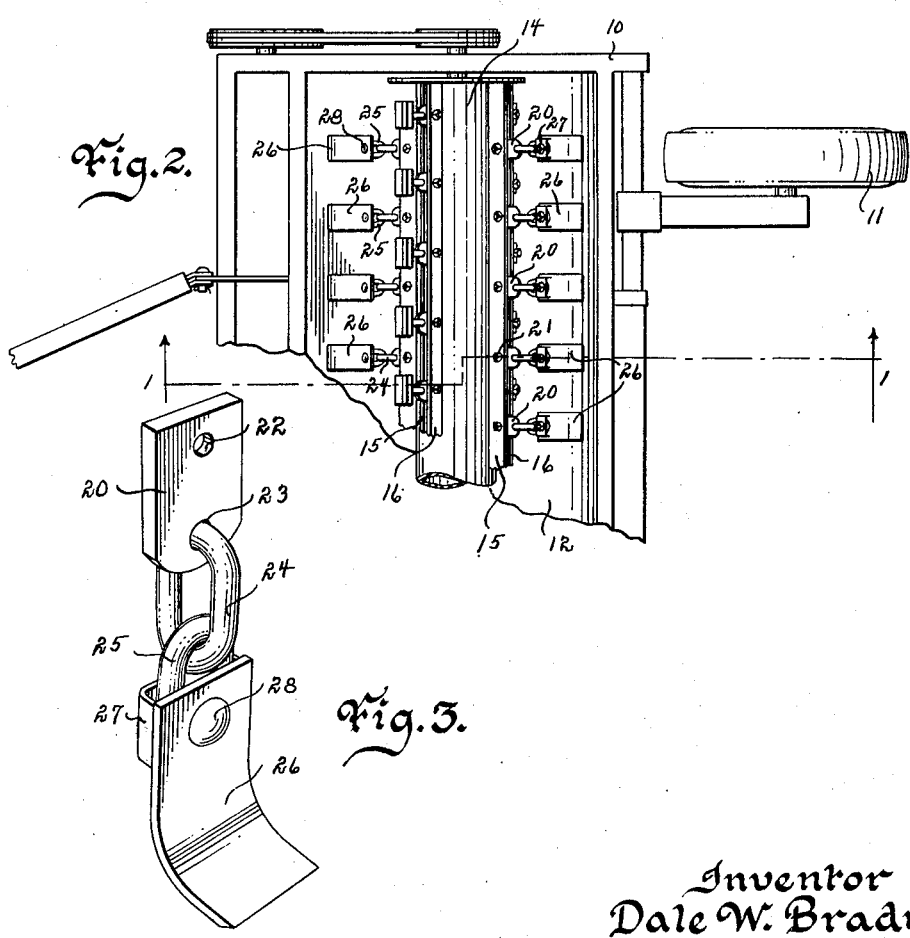
Inventor
Dale W. Brady
by M. Talbert Dick
Attorney
Witness
Edward P. Seeley

2,902,813
VEGETATION CUTTING MEANS

Dale W. Brady, Altoona, Iowa

Application May 17, 1957, Serial No. 659,846

2 Claims. (Cl. 56—24)

This invention relates to vegetation cutting means and more particularly to farm implements used in the gathering of crops or the macerating of undesirable plant growth.

Most implements of this type were originally used to chop up and macerate undesirable crop residue such as corn stalks, cotton stalks and like, so that the ground could be successfully plowed for the next crop. However, it was often found desirable to gather the severed and chopped up matter for commercial usage and the idea of providing an exit chute leading to a wagon box or like was created. Next, it was discovered that such macerating machines were excellent for cutting hay, feed and like, thus taking the place of the cycle type mowing machine for this purpose. Most of these stalk cutters used a rotating drum from which radially extended hammer arms, chains and like. While such beaters or flails did successfully mow grass, the result was uneven cutting and often insufficient air fanning to raise all of the cut particles up and through the exit chute.

Therefore, one of the principal objects of my invention is to provide vegetation cutting means for the rotating drums of vegetation cutting machines that severs the plant life evenly and uniformly above the ground surface over which the device passes.

A further object of this invention is to provide a cutting means for gathering machines that produces sufficient moving air to carry the severed crop up and through a delivery chute.

A still further object of my invention is to provide a crop gathering unit blade means that may easily and quickly be removed or replaced thereby making repairs easy and inexpensive.

Still further objects of my invention are to provide a crop cutting means that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a cross side sectional view of a crop gathering machine using my cutting arm blade means and is taken on line 1—1 of Fig. 2, Fig. 2 is a fragmentary bottom sectional view of a crop gathering machine with my cutting blade means and more fully illustrates its construction, and Fig. 3 is an enlarged perspective view of one of the cutting blade units.

The machines such as disclosed in my previously identified co-pending application have a frame portion 10 supported above the ground by wheels 11. The numeral 12 designates an elongated hood on the frame 10 and which terminates into the usual exit chute conduit 13. This conduit chute extends upwardly and rearwardly and communicates at its lower end to the inside of the hood 12 as shown in Fig. 1. Rotatably mounted in and longitudinally with the hood 12 is the shaft drum 14. Usually such machines are secured at their forward end to the drawbar of a pulling tractor (not shown). The power takeoff of the tractor is operatively connected to the shaft drum 14 for rotating the drum shaft 14 in a direction wherein its lower plane travels forwardly and upwardly and in the direction of travel of the vehicle. Herebefore hammer arms, chains and like radially extend from the drum shaft 14. My invention, and which I will now describe in detail, consists of special arm knife units for such drum shafts and the means of securing the arm knife units to the drum shaft.

I mount my arm knife units in evenly spaced apart longitudinal rows on the drum shaft. Any number of rows may be installed but in the drawings I show four rows. On the drum shaft I weld or otherwise secure four evenly spaced apart pairs of flanges. Each pair of flanges consists of two spaced apart bars 15 and 16, as shown in Fig. 1. These bars extend longitudinally of the longitudinal length of the drum shaft and each has its width extending radially from the drum shaft.

Into the space between each pair of bars 15 and 16, I position a plurality of my arm blade cutting units. These arm blade cutting units are spaced apart, but the units between one pair of bars do not necessarily follow the units of other bars so that all of the vegetation will be evenly cut from one end of the cutting means to the other and without leaving any uncut material that might be missed between any given two cutting units of one pair of bars. Inasmuch as the arm cutting blade units are duplicates of each other, I will only describe the construction of one cutting unit such as shown in Fig. 3.

I have used the numeral 20 to designate the base block having a thickness substantially that of the distance between the two bars 15 and 16. When installed this base 20 is placed between the two receiving flange bars 15 and 16 and a securing bolt 21 is extended through the two bars and through the hole 22 in the base 20. When the bolt 21 is tightened, the base 20 will be clamped between the two bars and rigidly held against movement relative thereto. The base 20 extends radially outwardly from the drum shaft and protrudes beyond the outer edges of the flange bars 15 and 16, as shown in Fig. 2. The numeral 23 designates a hole extending through the outer end area portion of the base 20 and which is located beyond the holding bars 15 and 16. The numeral 24 designates a chain link extending through the hole 23 as shown in Fig. 3. The numeral 25 designates a second chain link extending through the chain link 24. The numeral 26 designates a curved rectangular cutting blade. This blade is elongated in length similar to that of a shovel and when mounted extends radially outwardly from the drum shaft with its length curved toward the direction of rotation of the drum shaft as shown in Fig. 1. On the inner back area of the blade 26 is a detachable U-shaped bracket washer 27 detachably embracing the outer end area of the second link 25. The numeral 28 designates a bolt means extending through the blade 26, the link 25, and the U-bracket washer 27, thereby detachably securing the blade to the chain link 25. Because the chain link 24 passes through the base, it will rest transversely of the base. Because the chain link 24 passes through the chain link 25, the chain link 25 will rest transversely of the chain link 24. Because the outer end of the chain link 25 rests flat and adjacent the back of the cutting blade, the cutting blade will be parallel with the chain link 25 and thus also parallel with the rectangular base portion 20. This normally places the cutting blade as shown in Fig. 1, and when the drum shaft is rotating the cutting blade units will be so held by centrifugal force.

However, there is yielding flexibility of the blade cutting unit. Due to the linkage between the two chain links and the chain link 24 passing through the hole 23, the cutting blade 26 may swing laterally against any existing centrifugal force that is yieldingly holding the unit radially outwardly. Also, due to the linkage between the two chain links 24 and 25, the cutting blade may swing forwardly or rearwardly relative to its direction of travel against any centrifugal force yieldingly holding the unit radially outwardly. The width of the cutting blades is such that not only will they each cut a relatively wide path, but will act as fan blades to deliver a powerful air stream upwardly and through the chute 13 to carry all cuttings through the chute and into a receiving container. If any cutting blade, or any element of the cutting unit becomes broken or damaged it may be easily and quickly replaced.

Some changes may be made in the construction and arrangement of my vegetation cutting means without departing from the real spirit and purpose of my invention, and it is my intention to cover by my claims, any modified forms of structure or use of mechanical equivalents which may be reasonably included within their scope.

I claim:

1. In a cutting unit, a base block adapted to be secured to a rotatably mounted shaft and having a hole, a chain link extending through the hole of said base block, a second chain link extending through said first mentioned chain link, a curved cutting blade, a U-shaped bracket washer embracing the outer end area of said second chain link, and a bolt extending through said blade, said second chain link and said U-shaped bracket washer.

2. In a cutting means, a shaft member, two spaced apart bar flanges on said shaft member, a base member having one end portion extending between said two spaced apart bar flanges, a bolt means extending through said two bar flanges and said base member; said base member having a hole, a chain link extending through the hole of said bar base, a second chain link extending through said first mentioned chain link, a curved cutting blade, a U-shaped bracket washer embracing the outer end area of said second chain link, and a bolt extending through said blade, said second chain link and said U-shaped bracket washer.

References Cited in the file of this patent
UNITED STATES PATENTS

| | | |
|---|---|---|
| 2,501,925 | Yensen et al. | Mar. 28, 1950 |
| 2,590,065 | Mott | Mar. 18, 1952 |
| 2,691,262 | Swertfeger | Oct. 12, 1954 |
| 2,718,741 | Meldahl | Sept. 27, 1955 |